United States Patent
Büttner et al.

(10) Patent No.: US 12,489,341 B2
(45) Date of Patent: Dec. 2, 2025

(54) SELF-VENTILATED ELECTRODYNAMIC ROTARY MACHINE

(71) Applicant: Innomotics GmbH, Nuremberg (DE)

(72) Inventors: Klaus Büttner, Hollstadt (DE); Reiner Grillenberger, Windsbach (DE); Tobias Katzenberger, Bad Königshofen STT Unteressfeld (DE); Klaus Kirchner, Ostheim (DE); Matthias Warmuth, Windshausen (DE)

(73) Assignee: Innomotics GmbH, Nuremberg (DE)

( * ) Notice: Subject to any disclaimer, the term of this patent is extended or adjusted under 35 U.S.C. 154(b) by 366 days.

(21) Appl. No.: 18/022,057

(22) PCT Filed: Jul. 20, 2021

(86) PCT No.: PCT/EP2021/070260
§ 371 (c)(1),
(2) Date: Feb. 17, 2023

(87) PCT Pub. No.: WO2022/042949
PCT Pub. Date: Mar. 3, 2022

(65) Prior Publication Data
US 2023/0361652 A1   Nov. 9, 2023

(30) Foreign Application Priority Data
Aug. 26, 2020  (EP) .................................. 20192910

(51) Int. Cl.
*H02K 9/06* (2006.01)
*H02K 5/18* (2006.01)

(52) U.S. Cl.
CPC ................. *H02K 9/06* (2013.01); *H02K 5/18* (2013.01)

(58) Field of Classification Search
CPC .................................. H02K 9/06; H02K 5/18
(Continued)

(56) References Cited

U.S. PATENT DOCUMENTS

| 3,226,580 A | 12/1965 | Oehlrich et al. |
| 2018/0219454 A1 | 8/2018 | Hangari |
| 2020/0052544 A1 | 2/2020 | Zhu et al. |

FOREIGN PATENT DOCUMENTS

| CH | 158 635 A | 11/1932 |
| CN | 2312541 Y * | 3/1999 |

(Continued)

OTHER PUBLICATIONS

PCT International Search Report and Written Opinion of International Searching Authority mailed Sep. 2, 2021 corresponding to PCT International Application No. PCT/EP2021/070260 filed Jul. 20, 2021.

*Primary Examiner* — Jose A Gonzalez Quinones
(74) *Attorney, Agent, or Firm* — Henry M. Feiereisen LLC (57) ABSTRACT

A self-ventilated electrodynamic rotary machine includes a housing configured to at least partially axially enclose the rotary machine, and a fan connected in a rotationally fixed manner to a shaft on a ventilation side of the rotary machine and configured to generate a main cooling air flow when the shaft rotates about an axis. The fan includes a cover which is configured to direct the main cooling air flow onto the housing and is structured to improve cooling of the housing. An air guide element is detachably fixed to the cover to generate an additional cooling air flow. The air guide element, when viewed in a circumferential direction, has a segmented design and is configured as separate part for retrofitting to the cover depending on a thermal requirement of the rotary machine.

9 Claims, 7 Drawing Sheets (58) Field of Classification Search
USPC .................................... 310/58, 60 R, 62–63
See application file for complete search history.

(56) References Cited

FOREIGN PATENT DOCUMENTS

| | | | |
|---|---|---|---|
| DE | 102015121695 A1 | * | 7/2016 |
| DE | 11 2017 007 480 T5 | | 1/2020 |
| EP | 3 358 724 A1 | | 8/2018 |
| JP | S62107546 U | * | 7/1987 |
| JP | H0268660 U | * | 5/1990 |

* cited by examiner

SELF-VENTILATED ELECTRODYNAMIC ROTARY MACHINE

CROSS-REFERENCES TO RELATED APPLICATIONS

This application is the U.S. National Stage of International Application No. PCT/EP2021/070260, filed Jul. 20, 2021, which designated the United States and has been published as International Publication No. WO 2022/042949 A1 and which claims the priority of European Patent Application, Serial No. 20192910.6, filed Aug. 26, 2020, pursuant to 35 U.S.C. 119(a)-(d).

BACKGROUND OF THE INVENTION

The invention relates to self-ventilated electrodynamic rotary machine.

The ventilation concept of such machines, e.g. an electric motor, usually consists of a fan non-rotatably fixed to a shaft and a ventilation cover guiding the generated air flow. Cooling air is drawn in axially through a grille in the ventilation cover and expelled outward by a radial fan. This results in a pressure buildup on the inner wall of the cover. This cooling air is deflected axially and accelerated in the direction of the machine housing. The cooling air exits the cover and ideally moves within/between the housing fins along the housing from the ventilation side to the drive side.

However, this theoretical view of ventilation does not correspond to actual reality. Having exited the cover, cooling air escapes radially from the fin region of the housing and thus loses its cooling function. The loss of cooling air increases markedly as the air passes axially along the fins to the drive side, so that the amount of cooling air still providing a cooling effect at the drive side is very small.

As a result of the insufficient cooling function, the machine or motor becomes hotter. In addition, the temperature at AS (drive side) is higher than at BS (ventilation side). This axial heat gradient within the machine means that the machine cannot be run at full capacity. Likewise, the drive-side bearings in particular are subject to increased thermal stress.

To achieve the required output or efficiency of the electrodynamic rotary machine, the electrically active part is therefore generously sized. In some cases, forced ventilation is used.

The object of the invention is therefore to create a self-ventilated electrodynamic rotary machine with improved use of the cooling air, thereby allowing a more compact design.

SUMMARY OF THE INVENTION

This object is achieved by a self-ventilated electrodynamic rotary machine having a housing at least partially axially enclosing the rotary machine, wherein the electrodynamic rotary machine has a drive side and a ventilation side, wherein, on the ventilation side, at least one fan is non-rotatably connected to a shaft and generates a main air flow when said shaft rotates about an axis, wherein the fan is provided with a cover which directs the main cooling air flow generated by the fan onto the housing, wherein means are provided on the cover for at least improving the cooling of the housing.

According to the invention, means are now provided on the cover which guide a cooling air flow along the housing. On the one hand, the cooling air flow is guided such that it sweeps along the housing for as long as possible, and on the other hand, an additional cooling air flow is provided.

The cover has at least one air guide element that provides an additional cooling air flow. The air guide element is provided at the cover outlet and directs the additional cooling air flow inward toward the machine axis. The air guide element has openings that are formed between axially extending ridges and air guide surfaces disposed therebetween. During operation of the fan—and therefore of the electrodynamic machine—the main cooling air flow is supplemented by fresh air drawn in radially from the outside according to the injector principle, i.e. generating the additional cooling air flow. This cooler air, coming from the outside, is preferably conveyed at an oblique angle onto the surface of the housing, in particular to the base of the cooling fins (in the case of a finned housing). This produces a significant improvement in the cooling function which is effective all the way to the drive side (AS), thereby reducing the axial temperature gradient within the machine.

Said air guide element is designed so as to produce mixing with the cooling air exiting the cover. This increases the cooling effect over the axial length of the machine.

The cooling function can be considerably increased by the inventive design of the cover in that a longer dwell time of the cooling air on the housing surface or between the housing fins is achieved.

The temperature of the entire electrical machine is lowered. The temperature difference between AS and BS is reduced. Winding and bearing temperatures are reduced, thereby increasing service life. The electrodynamic machine operates more efficiently.

The air guide surfaces are angled with respect to the axis. This improves the injector principle and thus the additional cooling air flow. The air guide surfaces are preferably provided with the same angle with respect to the axis, but it is also possible to assign different angles to the air guide surfaces during manufacture of the air guide element.

In addition, the air guide surfaces follow the contour of the housing; in other words, the curvature of the respective air guide surfaces viewed in the circumferential direction has a radius dependent on the housing diameter.

The cover can be of one-piece design with a predeterminable number of air guide elements. An air guide element is understood as being a circumferentially closed or segmented part. These parts can also be disposed axially one behind the other.

A one-piece design simplifies production, since only one part has to be "handled". This one part is therefore constituted by the cover and one or more air guide elements, wherein the air guide elements each have ridges, air guiding surfaces and openings.

Alternatively, the air guide element is of segmented design when viewed in the circumferential direction and is detachably fixed to the cover. The cover and the air guide element(s) are separate parts that can be retrofitted to the cover depending on the thermal requirements of the electrical machine.

In order to be able to optimally meet the thermal requirements of the electrical machine, the segments of the air guide elements have axially different extents and/or different numbers of openings and/or different inclinations of the air guide surfaces.

Depending on the thermal requirements, a plurality of the segmented air guide elements can also be disposed axially along the housing. For example, four or six segments of air guide elements are therefore disposed circumferentially around the cover. This means that the entire circumference is impinged upon. Particularly in the case of axially shorter machines, the terminal box may impede any further axial extension, so that further air guide elements would only have to be provided axially on the remaining circumference.

The mechanical connection between the cover and the air guide elements, as well as between the air guide elements, particularly in the axial direction, is provided by detachable clips or snap-fit connections.

Alternatively or additionally, means for reducing the inner radius are provided on the inner radius at the axial end of the cover (facing the AS side). According to the invention, the cooling air is not directed onto the housing surface or rather the fin region in an axially parallel manner, but is guided onto the surface or rather into the base of the cooling fins at an angle to the machine axis, i.e. inward towards the machine axis.

This is achieved by corresponding contours at the axial end of the cover. Before exiting the cover, the cooling air is directed inward to the base of the cooling fins, e.g. by means of an inclination, i.e. a continuous reduction of the inner radius. This significantly extends the dwell time of the cooling air in the cooling fins and increases the cooling function along the housing.

This can also be achieved by a separate reducing element positioned at the end of the cover. This reducing element has a wedge-shaped cross-section.

This reducing element is provided at least in some sections when viewed in the circumferential direction, in particular at those sections of the cover which require preferential cooling.

The cover is essentially pot-shaped, which simplifies the mounting and attachment of the air guide elements and/or the reducing elements.

If the inner radius of the cover is larger than the outer radius of the housing, the inclination of the cover can rest in particular on the fins of the housing.

If the housing is provided with fins, at least in some sections, this can improve cooling as well as contribute to the mechanical stability of the air guide elements on the housing and on the cover.

According to the invention, the cooling air is now not directed in an axially parallel manner into the fin region, but is guided into the base of the cooling fins at an angle to the machine axis, i.e. inward toward the machine axis.

The inclination at the end of the cover significantly extends the dwell time of the cooling air in the cooling fins and increases the cooling function along the housing.

If at least one additional air guide element is provided at the cover outlet, said element also guiding the air inward toward the machine axis, the cooling effect is enhanced still further. During operation of the fan—and thus of the electrodynamic machine—fresh air is additionally drawn in radially from outside according to the injector principle, i.e. an additional cooling air flow is generated. This cooler air, coming from the outside, is preferably conveyed at an oblique angle into the base of the cooling fins and ensures a considerable improvement in the cooling function which is effective as far as the drive side (AS), thereby reducing the axial temperature gradient within the machine.

Said air guide element is advantageously designed to ensure mixing with the cooling air exiting the cover. This increases the cooling effect over the axial length of the machine.

The cooling function can be considerably increased by the inventive design of the cover and/or of the air guide elements in that a longer dwell time of the cooling air in the housing fins is achieved.

The temperature of the entire motor is lowered. The temperature delta between AS and BS is reduced. Winding and bearing temperatures are reduced, thereby increasing service life. The electrodynamic machine operates more efficiently.

The air guide element can be made of metal or plastic, as can the cover. Likewise, the cover and/or the air guide element can be injection molded or 3D-printed.

Additional support of the air guide element on the housing or the housing fins improves the mechanical stability, in particular if a plurality of air conduction elements disposed axially one behind the other are provided.

BRIEF DESCRIPTION OF THE DRAWING

The invention as well as further advantageous embodiments of the invention will now be explained in more detail by means of exemplary embodiments illustrated in principle in the drawings wherein.

DETAILED DESCRIPTION OF PREFERRED EMBODIMENTS

Figure 1:
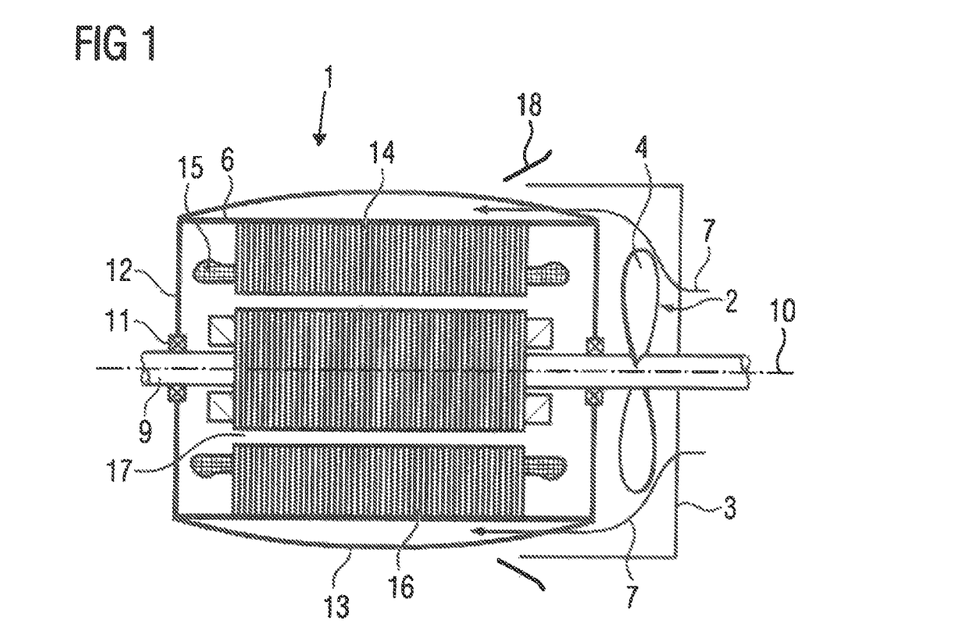
FIG. 1 shows a longitudinal section through a dynamoelectric machine.

FIG. 1 shows a longitudinal section through a dynamoelectric rotary machine 1 illustrated in principle, in particular an asynchronous motor with squirrel cage rotor. The dynamoelectric machine 1 has a stator 14 which is of laminated design and has winding overhangs of a winding system 15 at its end faces. The stator 14 is inserted in a housing 6, in particular such that heat is transferred from the stator 14 to the housing 6. Distributed around its outer circumference, the housing 6 has essentially radially projecting fins 13 which are used to cool the electrical machine 1.

The energized winding system 15 of the stator 14 sets up an electromagnetic interaction with a rotor 16 via an air gap 17, causing a shaft 9 to rotate about an axis 10. The shaft 9 is positioned on the housing 6 via bearings 11 and associated end shield 12. On the shaft 9, a fan 2 is non-rotatably connected to the shaft 9. This fan 2 has essentially radially extending fan blades 4. The fan 2 draws in an air flow axially via apertures 5 in a cover 3, which air flow is then deflected by the fan blades 4 and with the aid of the cover 3, so that a main cooling air flow 7 is established essentially axially along the fins 13.

However, after exiting the cover 3, cooling air gradually escapes radially from the fin region of the housing 6 and thus loses its cooling function. The loss of cooling air increases sharply as it passes axially along the fins 13 to the drive side, so that the amount of cooling air that still has a cooling effect on the drive side is very small.

Figure 2:
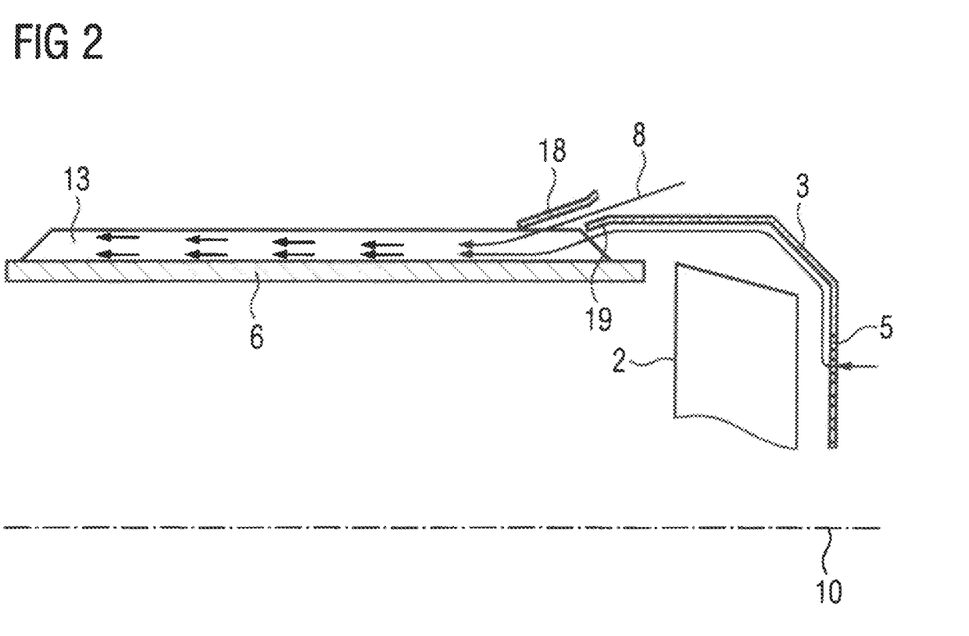
FIG. 2 shows a detailed representation.

This premature removal of the cooling air flow from the housing surface is now avoided, as shown in FIG. 2, by reducing the inner radius of the cover 3 at its axial end and/or by the air guide elements 18, thereby significantly improving cooling.

The reduction of the inner radius at the axial end of the cover 3 can also be created by an additional reducing element positioned in or on the cover 3. Said reducing element is wedge-shaped when viewed in cross-section.

By means of air guide elements 18, which are already provided in one piece on the cover 3 or can be fitted by additional means, an additional cooling air flow 8 is generated during operation of the fan 2, said cooling air flowing via the openings 21 to the housing surface and/or between the fins 13.

Even in the case of a one-piece cover 3, only certain angular sections around the cover 3 can be occupied by the air guide elements 18. There are therefore covers 3 in which only a predeterminable angular section is occupied, and there are also covers 3 in which air guide elements 18 occupy the entire circumference.

In the case of separate air guide elements 18 segmented in the circumferential direction, these can be positioned on the cover 3 and/or on the housing 6.

The air guide element 18 has axially extending ridges 23 on which air guide surfaces 26 are disposed. Between the air guide surfaces 26 in the axial direction are openings 21 which allow the additional cooling air flow 8 during operation of the electrodynamic rotary machine 1. The air guide surfaces 26 essentially follow the contour of the housing 6, in other words, viewed in the circumferential direction, the curvature of the respective air guide surfaces 26 has a radius dependent on the diameter of the housing 6.

Figure 3:
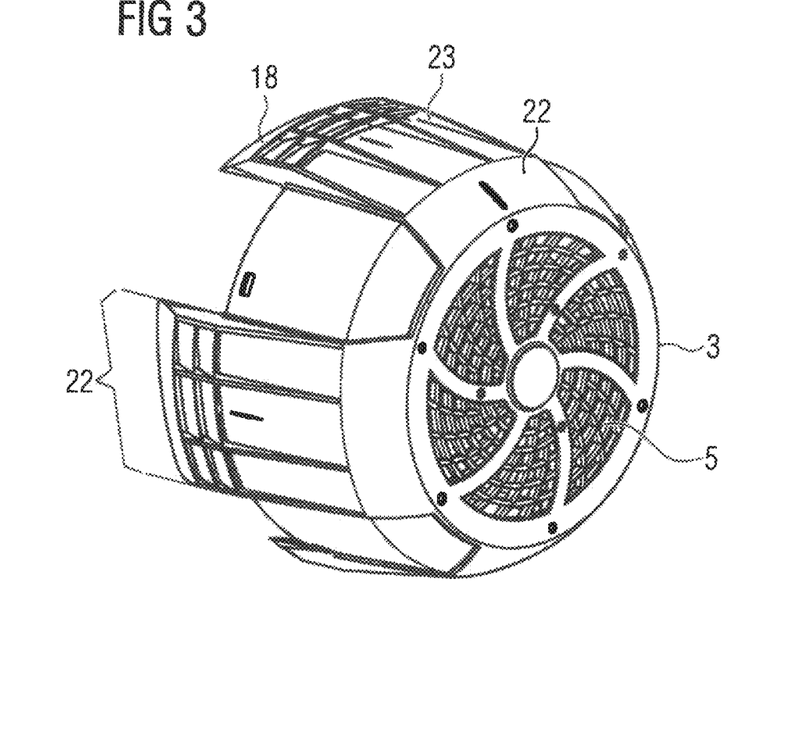
FIGS. 3 to 7 show partial perspective views.

FIG. 3 shows a plurality of separate air guide elements 18 disposed on the cover 3. Not all the angular sections are occupied in the circumferential direction.

Figure 4:
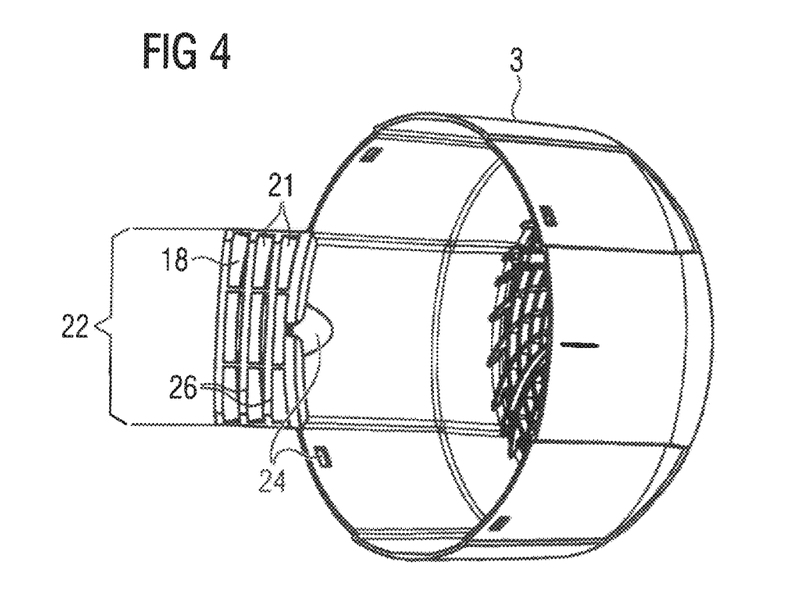

In another detailed view, FIG. 4 shows the cover 3 with a segmented air guide element 18 attached to the cover 3 by means of an e.g. detachable clip connection in a recess of the cover 3.

Figure 5:
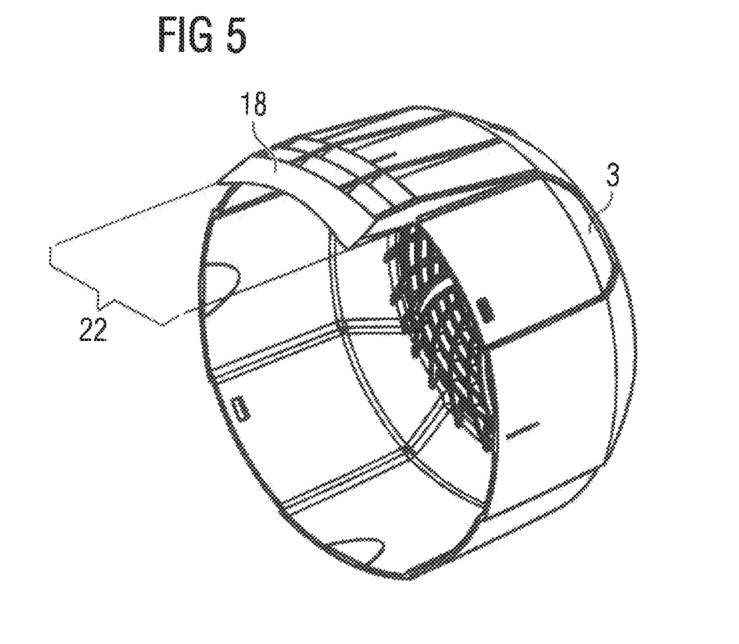

The ridges 23 project axially in the direction of the ventilation side for mechanical and/or flow-related reasons, as can also be seen in particular from FIG. 5.

Figure 6:
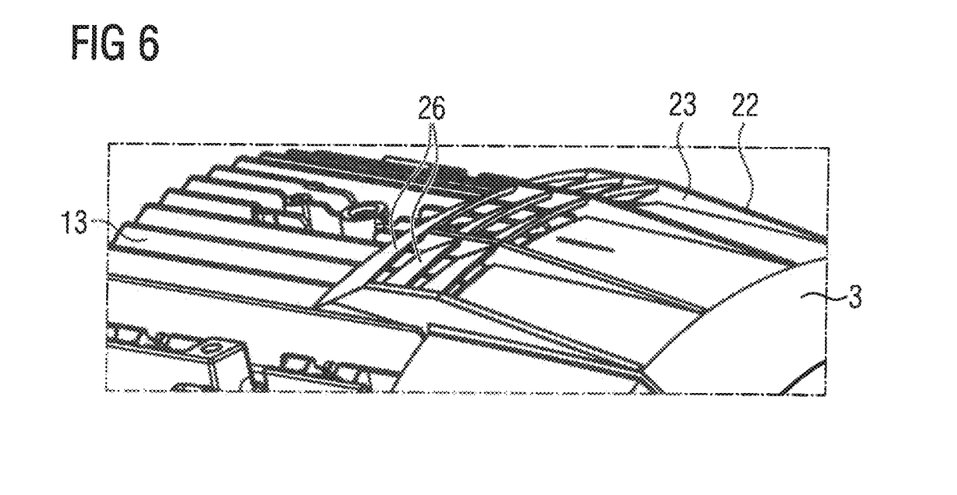

FIG. 6 shows a segment of an air guide element 18 on the cover 3, having two rows of three air guide surfaces 26 each disposed axially one behind the other which have openings 21 between the axial end of the cover and the first air guide surface 26 or between the air guide surfaces 26.

Figure 7:
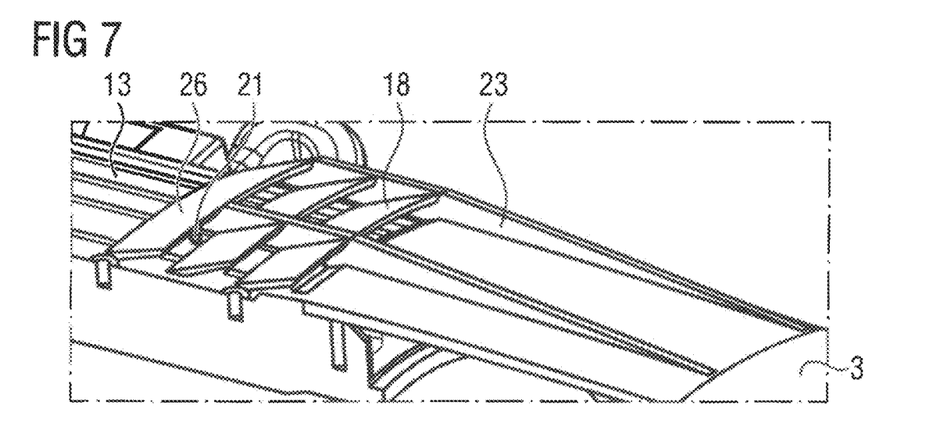

FIG. 7 shows in particular the angle of inclination of the air guide surfaces 26 with respect to the axis 10. This results in the injector effect so that, in addition to a main cooling air flow 7, an additional cooling air flow 8 is generated which contributes to the cooling of the machine 1.

The angling of the air guide surfaces 26 is preferably taken into account in the manufacture of the cover 3 if the cover 3 and air guide elements 18 are made in one piece, e.g. by injection molding or 3D printing.

If the air guide elements 18 are manufactured separately and are to be clipped onto the cover 3, the angle can be taken into account during manufacture. Having separate air guide elements 18 means that they are also interchangeable, thereby obtaining axially longer air guide elements 18 and/or obtaining a different angle of the air guide surfaces 26.

Figure 8:
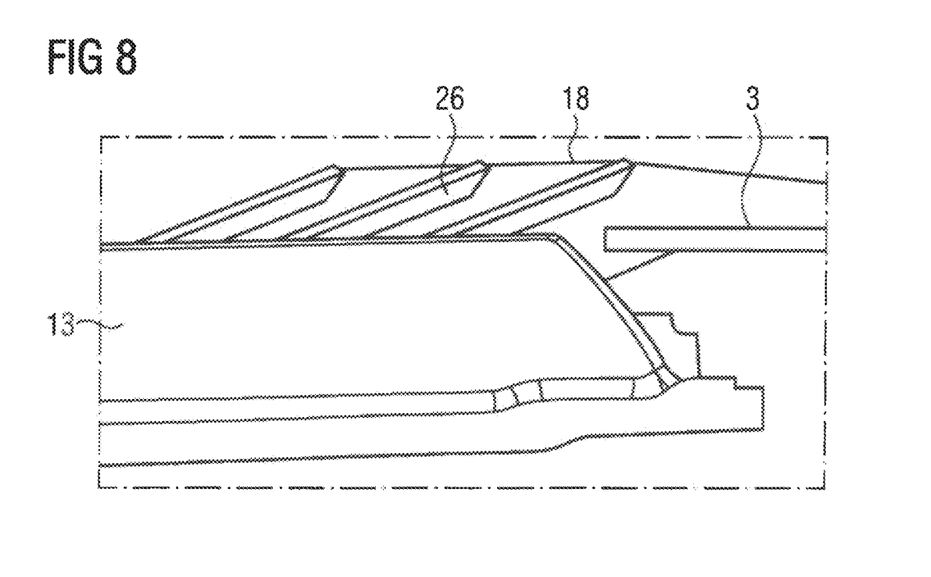
FIG. 8 shows a partial longitudinal section through the dynamoelectric machine.

FIG. 8 shows in principle how the segmented air guide elements 18 can be attached to the cover 3, e.g. by a hook engaging in a recess at the axial end of the cover 3. The air guide surfaces 26 rest on or are slightly spaced from the fins 3. The ridges 23 rest on the cover 3.

Figure 9:
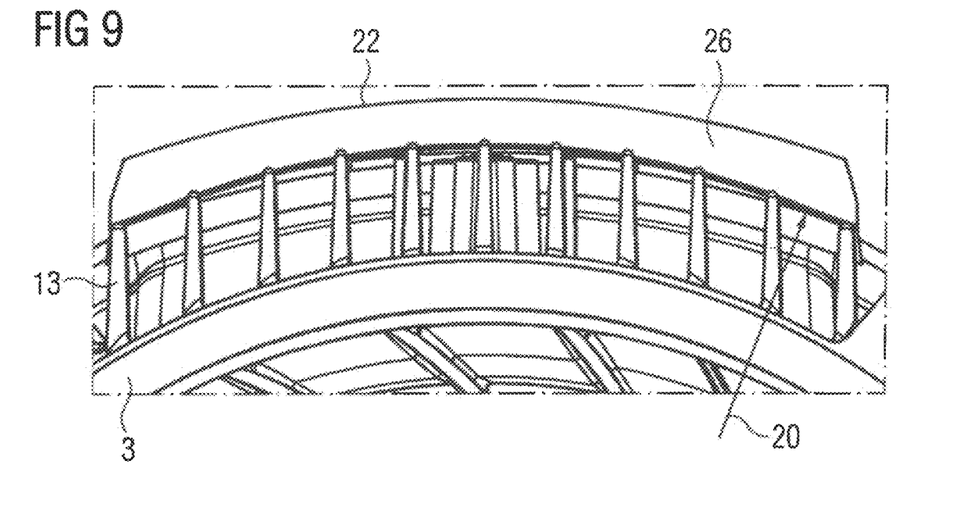
FIG. 9 shows a partial cross-section of the dynamoelectric machine.

The resting of the air guide surfaces 26 on the fins can also be seen in FIG. 9.

Figure 10:
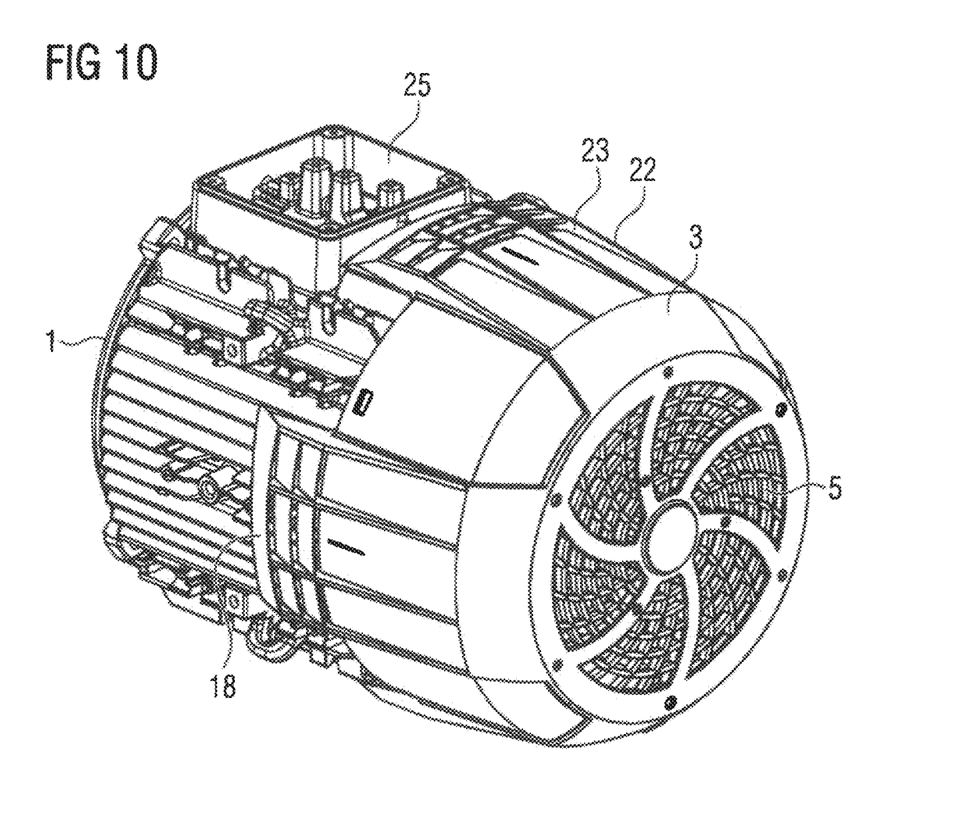
FIG. 10 shows a perspective view of a dynamoelectric machine.

FIG. 10 shows a cover 3 with air guide elements 18, wherein an angular segment on the cover 3 is not occupied by the air directing element 18.

Figure 11:
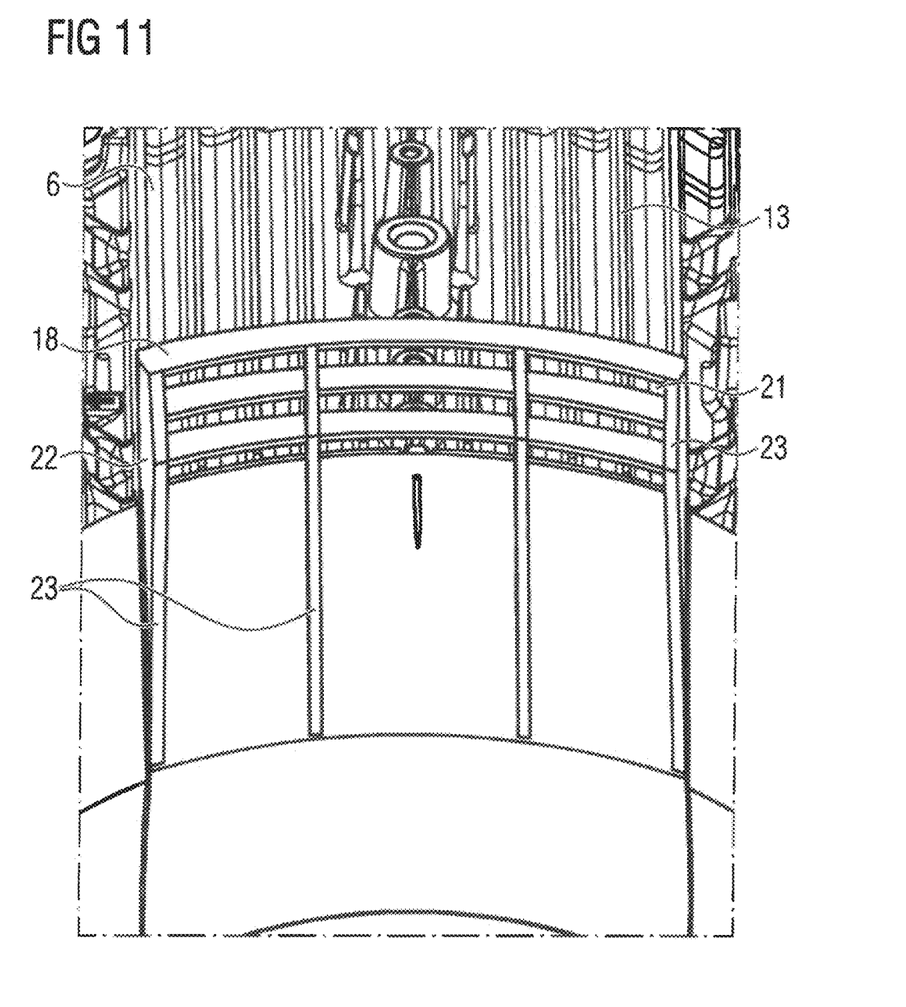
FIG. 11 shows a top view of a part of a dynamoelectric machine.

FIG. 11 shows a top view of an air guide element 18 on the cover 3 and a section of the dynamoelectric machine 1 with the housing 6 to be cooled or more specifically the fins 13.

The invention claimed is:

1. A self-ventilated electrodynamic rotary machine, comprising:
    a housing configured to at least partially axially enclose the rotary machine;
    a fan connected in a rotationally fixed manner to a shaft on a ventilation side of the rotary machine and configured to generate a main cooling air flow when the shaft rotates about an axis, said fan comprising a cover which is configured to direct the main cooling air flow onto the housing and is structured to improve cooling of the housing; and
    an air guide element detachably fixed to the cover to generate an additional cooling air flow said air guide element when viewed in a circumferential direction, having a segmented design and configured as separate part for retrofitting to the cover depending on a thermal requirement of the rotary machine,
    wherein the air guide element comprises ridges and air guide surfaces located between the ridges, with openings located between the air guide surfaces.

2. The self-ventilated electrodynamic rotary machine of claim 1, wherein the air guide surfaces are angled with respect to the axis.

3. The self-ventilated electrodynamic rotary machine of claim 1, wherein the air guide element includes segments of axially different extents and/or different numbers of openings.

4. The self-ventilated electrodynamic rotary machine of claim 1, further comprising a plurality of said guide element of segmented design, with the guide elements disposed axially along the housing.

5. The self-ventilated electrodynamic rotary machine of claim 1, further comprising a structure at an axial end of the cover to reduce an inner radius of the cover.

6. The self-ventilated electrodynamic rotary machine of claim 5, wherein the structure is configured in one of two ways, a first way in which the structure is a reducing element provided at least in one section of the cover in a circumferential direction of the cover, a second way in which the axial end of the cover is inclined radially to the axis.

7. The self-ventilated electrodynamic rotary machine of claim 1, wherein the cover has an essentially pot-shaped configuration.

8. The self-ventilated electrodynamic rotary machine of claim 1, wherein the cover has an inner radius which is larger than an outer radius of the housing.

9. The self-ventilated electrodynamic rotary machine of claim 1, wherein the housing includes at least one section provided with fins.

* * * * *